US011899854B2

(12) United States Patent
Yu et al.

(10) Patent No.: US 11,899,854 B2
(45) Date of Patent: Feb. 13, 2024

(54) IMAGE DISPLAY DEVICE AND METHOD OF OPERATING THE SAME

(71) Applicant: LG ELECTRONICS INC., Seoul (KR)

(72) Inventors: Seonil Yu, Seoul (KR); Janghee Lee, Seoul (KR); Sanghyun Baek, Seoul (KR); Sanghun Kim, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 0 days.

(21) Appl. No.: 18/008,321

(22) PCT Filed: Jun. 4, 2020

(86) PCT No.: PCT/KR2020/007256
§ 371 (c)(1),
(2) Date: Dec. 5, 2022

(87) PCT Pub. No.: WO2021/246548
PCT Pub. Date: Dec. 9, 2021

(65) Prior Publication Data
US 2023/0205324 A1 Jun. 29, 2023

(51) Int. Cl.
G06F 3/0346 (2013.01)
(52) U.S. Cl.
CPC .................. G06F 3/0346 (2013.01)
(58) Field of Classification Search
CPC ...... G06F 3/017; G06F 3/0346; G06F 3/0383; G06F 3/0487; G06F 3/0481; G06F 3/04812; H04N 21/42204; H04N 21/44227; H04N 21/44231; H04N 21/42222

See application file for complete search history.

(56) References Cited

U.S. PATENT DOCUMENTS

| 2011/0004887 A1* | 1/2011 | Stringer | G06F 3/0481 |
| | | | 345/666 |
| 2011/0169734 A1* | 7/2011 | Cho | G06F 3/0346 |
| | | | 345/157 |

(Continued)

Primary Examiner — Richard J Hong
(74) Attorney, Agent, or Firm — LEE, HONG, DEGERMAN, KANG & WAIMEY

(57) ABSTRACT

The present disclosure relates to an image display device and a method of operating the same. The image display device according to an embodiment of the present disclosure includes: a display configured to display a pointer corresponding to a remote controller; an external device interface including at least one communication module and configured to perform short-range communication; and a controller, wherein the controller: receives, from the remote controller, an input signal including movement data of the remote controller through the external device interface; monitors a connection status with the remote controller based on the received input signal; if the connection status is good, calculates coordinates of the pointer based on the movement data included in the input signal; if the connection status is bad, processes the movement data included in the input signal, and then calculates coordinates of the pointer based on the processed data; and displays the pointer on the display based on the calculated coordinates of the pointer. Various other embodiments are also possible.

9 Claims, 9 Drawing Sheets

(56) References Cited

U.S. PATENT DOCUMENTS

| | | | |
|---|---|---|---|
| 2012/0062457 A1* | 3/2012 | Lee | G06F 3/04812 |
| | | | 345/157 |
| 2013/0128127 A1* | 5/2013 | Xu | H04N 21/42222 |
| | | | 348/734 |
| 2013/0314396 A1* | 11/2013 | Kang | H04N 21/42204 |
| | | | 345/214 |
| 2016/0110057 A1* | 4/2016 | Choi | G06F 3/0487 |
| | | | 345/158 |
| 2016/0224134 A1* | 8/2016 | Jung | G06F 3/0346 |

\* cited by examiner

<601>

<602>

<701>

<702>

<703>

IMAGE DISPLAY DEVICE AND METHOD OF OPERATING THE SAME

CROSS-REFERENCE TO RELATED APPLICATIONS

This application is the National Stage filing under 35 U.S.C. 371 of International Application No. PCT/KR2020/007256, filed on Jun. 4, 2020, the contents of which are all incorporated by reference herein in their entirety.

TECHNICAL FIELD

The following description relates to an image display device and a method of operating the same.

BACKGROUND ART

An image display device functions to display images to a user, such that the user can view broadcasts using the image display device. For example, the image display device may include a liquid crystal display (LCD) using liquid crystal, or a Television (TV), monitor, or projector with an Organic Light Emitting Diode (OLED) display using OLED, and the like.

The image display device may transmit and receive data via wired/wireless communication with various external devices. For example, by using Bluetooth communication as one of near field communication (NFC) technologies, the image display device may receive a control signal, corresponding to a user input, from a remote controller or may transmit an audio signal to an external audio device.

Meanwhile, as the number of external devices communicatively connected to the image display device increases, an amount of bandwidth usage between the image display device and the external devices increases, leading to an increase in data throughput per hour.

In this case, if there is an excessive number of external devices communicatively connected to the image display device or if an amount of data per hour, which are transmitted/received between the image display device and the external devices, rapidly increases, for example, as in the case where a high-quality audio signal is transmitted to an external audio device while a user operates a remote controller, an amount of bandwidth usage may rapidly increase, thereby causing a problem in that communication performance between the image display device and the remote controller may be degraded.

In addition, if the image display device fails to receive signals in a predetermined period due to degradation in communication performance between the image display device and the remote controller, the remote controller re-transmits signals or is requested to re-transmit signals, such that the amount of bandwidth usage increases more, thereby further degrading communication performance between the image display device and the remote controller.

Meanwhile, due to an external factor that affects a communication environment between the image display device and the remote controller, e.g., due to an increasing amount of bandwidth used for Wireless Fidelity (Wi-Fi) signal having the same frequency band as Bluetooth communication, etc., the communication performance between the image display device and the remote controller may also be degraded.

As described above, if the communication performance between the image display device and the remote controller is degraded due to various factors, the image display device may frequently fail to receive signals transmitted from the remote controller, such that a controlling operation in response to a user input received from the remote controller may not be performed smoothly, or movement of a pointer corresponding to movement of the remote controller may be displayed unnaturally on a display of the image display device.

DISCLOSURE OF INVENTION

Technical Problem

It is an objective of the present disclosure to solve the above and other problems.

It is another objective of the present disclosure to provide an image display device capable of naturally displaying a pointer, corresponding to movement of a remote controller, even when communication performance between an image display device and the remote controller is degraded due to an effect of an external environment, and a method of operating the image display device.

Technical Solution

In order to achieve the above objectives, an image display device according to an embodiment of the present disclosure includes: a display configured to display a pointer corresponding to a remote controller; an external device interface including at least one communication module and configured to perform short-range communication; and a controller, wherein the controller: receives, from the remote controller, an input signal including movement data of the remote controller through the external device interface; monitors a connection status with the remote controller based on the received input signal; if the connection status is good, calculates coordinates of the pointer based on the movement data included in the input signal; if the connection status is bad, processes the movement data included in the input signal, and then calculates coordinates of the pointer based on the processed data; and displays the pointer on the display based on the calculated coordinates of the pointer.

Meanwhile, a method of operating an image display device according to an embodiment of the present disclosure includes: receiving, from a remote controller connected via short-range communication, an input signal including movement data of the remote controller; monitoring a connection status with the remote controller based on the received input signal; if the connection status is good, calculating coordinates of the pointer corresponding to the remote controller based on the movement data included in the input signal; if the connection status is bad, processing the movement data included in the input signal, and then calculating coordinates of the pointer based on the processed data; and displaying the pointer on a display of the image display device based on the calculated coordinates of the pointer.

Advantageous Effects of Invention

An image display device and a method of operating the same according to the present disclosure have the following effects.

According to various embodiments of the present disclosure, a communication status between an image display device and a remote controller is monitored, and even when the image display device fails to receive movement data of the remote controller due to a bad communication status, the image display device may naturally display a pointer, corresponding to movement of the remote controller, on a display based on previously received movement data.

In addition, according to various embodiments of the present disclosure, if the communication status between the image display device and the remote controller is bad, the image display device may change a period of data transmission and reception between the image display device and the remote controller, and may change an amount of movement data included in the input signal output from the remote controller, thereby naturally displaying the pointer, corresponding to movement of the remote controller, on the display.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

MODE FOR THE INVENTION

Figure 1:
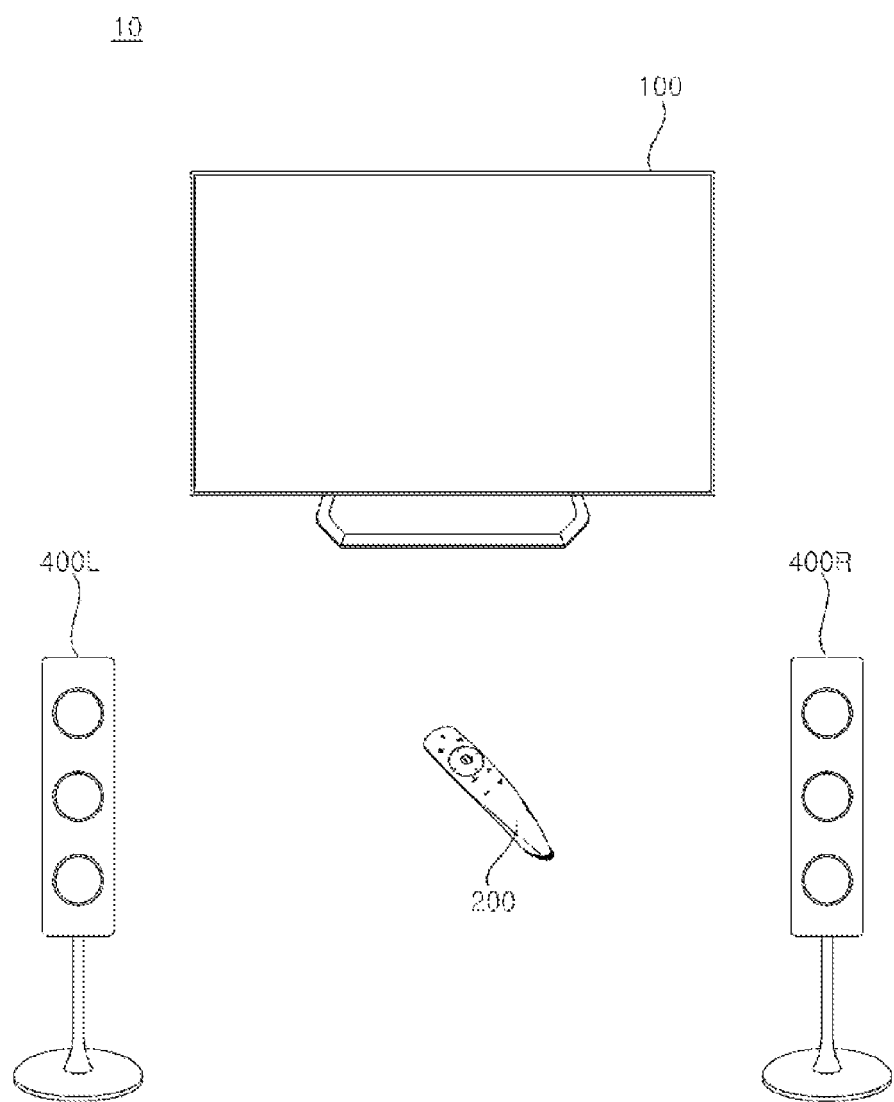
FIG. 1 is a diagram illustrating an image display system according to various embodiments of the present disclosure.

Description will now be given in detail according to exemplary embodiments disclosed herein, with reference to the accompanying drawings. In order to clearly and briefly describe the present disclosure, components that are irrelevant to the description will be omitted in the drawings, and the same reference numerals are used throughout the drawings to designate the same or similar components.

Terms "module" and "unit" for elements used in the following description are given simply in view of the ease of the description, and do not have a distinguishing meaning or role. Therefore, the terms "module" and "unit" may be used interchangeably.

In the following description, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Further, it will be understood that although the terms first, second, etc. may be used herein to describe various elements, these elements should not be limited by these terms. These terms are only used to distinguish one element from another.

FIG. 1 is a diagram illustrating an image display system according to an embodiment of the present disclosure.

Referring to FIG. 1, an image display system 10 may include an image display device 100, a remote controller 200, and/or an external audio device 400.

The image display device 100 may be a device for processing and outputting images. The image display device 100 may be a TV, a notebook computer, a monitor, etc., but is not particularly limited as long as the image display device may output a screen corresponding to an image signal.

The image display device 100 may receive a broadcast signal and process the received broadcast signal, and may output a signal-processed broadcast image. In the case where the image display device 100 receives the broadcast signal, the image display device 100 may serve as a broadcast receiving device.

The image display device 100 may receive the broadcast signal wirelessly through an antenna or by wire via cables. For example, the image display device 100 may receive a terrestrial broadcast signal, a satellite broadcast signal, a cable broadcast signal, an Internet Protocol TV (IPTV) broadcast signal, and the like.

The remote controller 200 may be connected wirelessly and/or by wire with the image display device 100 to provide various control signals to the image display device 100. In this case, the remote controller 200 may include a device for establishing a wired/wireless network with the image display device 100 and for transmitting various control signals to the image display device 100 or for receiving, from the image display device 100, signals related to various operations processed by the image display device 100, through the established network.

For example, various input devices, such as a mouse, a keyboard, a pointing device, a trackball, a joystick, etc., may be used as the remote controller 200. The remote controller 200 may be referred to as an external device, and the external device and the remote controller will be used interchangeably as needed hereinafter.

The image display device 100 may be connected to only a single remote controller 200 or may be simultaneously connected to two or more remote controllers 200, and may change an object displayed on a screen or adjust a screen state based on control signals provided by the respective remote controllers 200.

Meanwhile, the image display device 100 may perform mutual communication with other external devices. For example, the image display device 100 may perform pairing for establishing a communication channel with external audio devices 400L and 400R, and may transmit and receive signals including data through the communication channel. In the following description of other external devices that perform mutual communication with the image display device 100, the external audio devices 400L and 400R will be used as an example, but the present disclosure is not limited thereto.

A frequency band used for communication between the image display device 100 and the remote controller 200 may overlap a frequency band used for communication between the image display device 100 and the external audio devices 400L and 400R. For example, the image display device 100 may communicate with the remote controller 200 and the external audio devices 400L and 400R by using Bluetooth® that operates in a Radio Frequency (RF) band of 2.4 GHz.

The external audio devices 400L and 400R may output audio based on an audio signal received from the image display device 100.

While two external audio devices 400L and 400R are illustrated in the drawing, the present disclosure is not limited thereto, and the image display system 10 may include one or three or more external audio devices. For example, in the case where the image display system 10 includes two external audio devices 400L and 400R, each of the two external audio devices 400L and 400R may communicate with the image display device 100, or any one (e.g., first audio device 400L) of the external audio devices 400L and 400R may communicate with the image display device 100 and may transmit data, received from the image display device 100, to the other one (e.g., second audio device 400R).

Meanwhile, the image display device 100 may also communicate with a relay device (not shown), such as an Access Point (AP). Here, the Access Point (AP) may refer to a network assisted device for allowing a device, connected via wired/wireless communication, to access a network. For example, the image display device 100 may communicate with the AP via Wireless Fidelity (Wi-Fi) communication and may access the Internet via the access point (AP).

Figure 2:
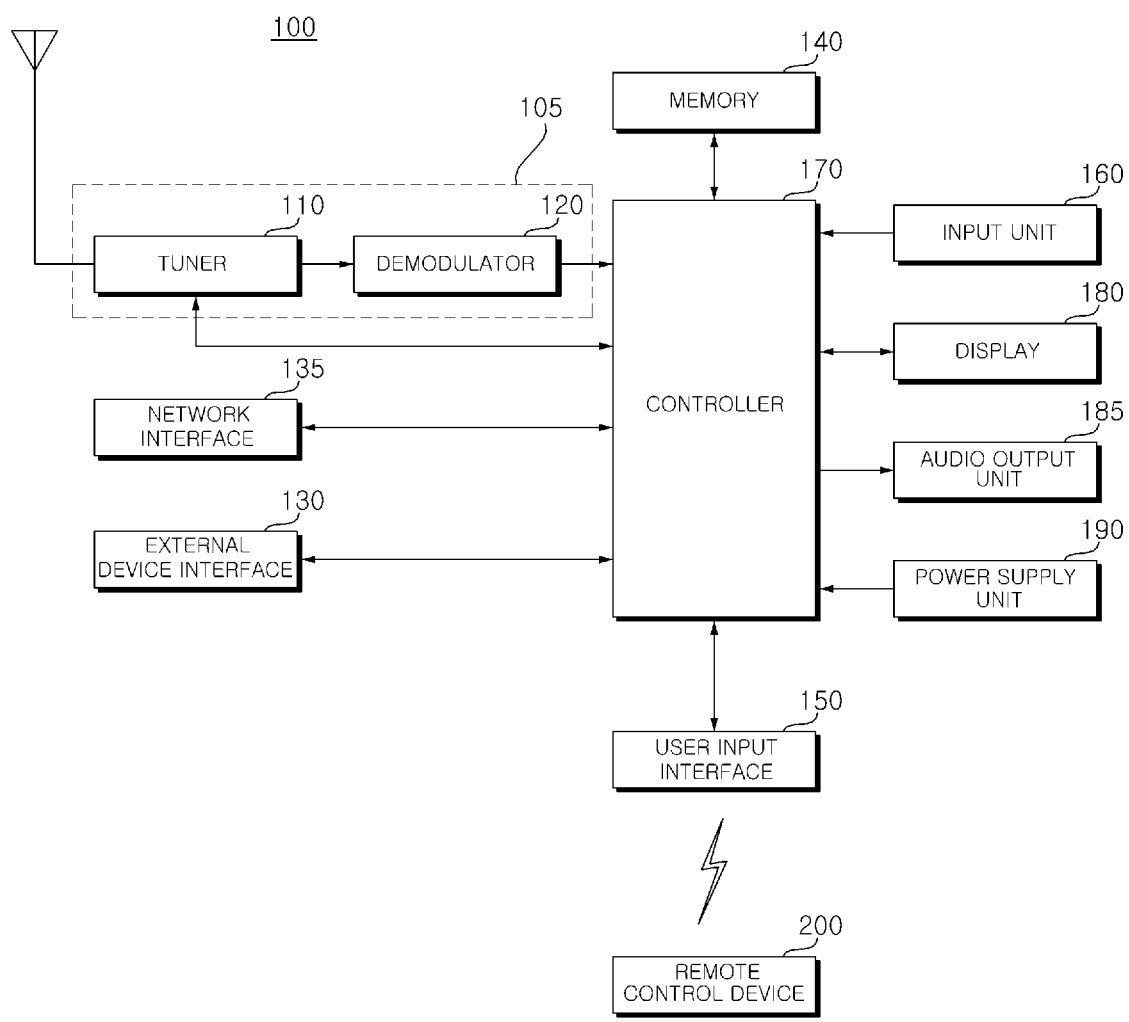
FIG. 2 is an internal block diagram of the image display device of FIG. 1.

FIG. 2 is an internal block diagram of the image display device of FIG. 1.

Referring to FIG. 2, the image display device 100 may include a broadcast receiver 105, an external device interface 130, a network interface 135, a memory 140, a user input interface 150, an input unit 160, a controller 170, a display 180, an audio output unit 185, and/or a power supply unit 190.

The broadcast receiver 105 may include a tuner 110 and a demodulator 120.

Meanwhile, unlike the drawing, the image display device 100 may include only the broadcast receiver 105 and the external device interface 130, among the broadcast receiver 105, the external device interface 130, and the network interface 135. That is, the image display device 100 may not include the network interface 135.

The tuner 110 may select a broadcast signal corresponding to a channel selected by a user or broadcast signals corresponding to all prestored channels from among Radio Frequency (RF) broadcast signals received through an antenna (not shown). The tuner 110 may convert a selected broadcast signal into an intermediate frequency (IF) signal or a baseband video or audio signal.

For example, if the selected RF broadcast signal is a digital broadcast signal, the tuner 110 may convert the selected RF broadcast signal into a digital IF signal (DIF), and if the selected RF broadcast signal is an analog broadcast signal, the tuner 100 may convert the selected RF broadcast signal into an analog baseband video or audio signal CVBS/SIF. That is, the tuner 110 may process digital broadcast signals or analog broadcast signals. The analog baseband video or audio signal CVBS/SIF output from the tuner 110 may be directly input to the controller 170.

Meanwhile, the tuner 110 may sequentially select RF broadcast signals of all the broadcast channels stored through a channel memory function from among the RF broadcast signals received through the antenna and may convert the selected broadcast signals into IF signals or baseband video or audio signals.

Meanwhile, the tuner 110 may include a plurality of tuners for receiving broadcast signals of a plurality of channels. Alternatively, the tuner 110 may be a single tuner that simultaneously receives broadcast signals of a plurality of channels.

The demodulator 120 may receive a digital IF signal DIF converted by the tuner 110 and may demodulate the digital IF signal.

Upon performing demodulation and channel decoding, the demodulator 120 may output a stream signal TS. In this case, the stream signal may be a multiplexed video signal, audio signal or data signal.

The stream signal output from the demodulator 120 may be input to the controller 170. Upon performing demultiplexing, video/audio signal processing, etc., the controller 170 may output an image to the display 180 and may output sound to the audio output unit 185.

The external device interface 130 may transmit or receive data to or from a connected external device (not shown), e.g., the image providing device 300 illustrated in FIG. 1. To this end, the external device interface 130 may include an A/V input/output unit (not shown).

The external device interface 130 may be connected by wire/wirelessly to external devices, such as a digital versatile disc (DVD) player, a Blu-ray player, a game console, a camera, a camcorder, a computer (laptop), a set-top box, etc., and may perform input/output operations for external devices.

In addition, the external device interface 130 may establish a communication network with various remote controller 200 as illustrated in FIG. 1, and may receive control signals related to operation of the image display device 100 or may transmit data related to operation of the image display device 100, through the established communication network.

In addition, the external device interface 130 may establish a communication channel with an external audio device 500 to transmit and receive data therebetween.

The A/V input/output unit may receive video and audio signals of an external device. For example, the A/V input/output unit may include an Ethernet terminal, a USB port, a composite video banking sync (CVBS) terminal, a component terminal, an S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, an SPDIF terminal, a liquid HD terminal, etc. A digital signal input through such terminals may be transmitted to the controller 170. In this case, an analogue signal input through the CVBS terminal and the S-video terminal may be converted into a digital signal by an analogue/digital conversion unit (not shown), and then may be transmitted to the controller 170.

The external device interface 130 may include a wireless communication module (not shown) for short-range wireless communication with other electronic devices. The external device interface 130 may exchange data with an adjacent device through the wireless communication module.

The network interface 135 may provide an interface for connecting the image processing device 100 to a wired/wireless network including an Internet network. For example, the network interface 135 may communicate by wire/wirelessly with a relay device, i.e., access point (AP), to access a local network via the AP or to be connected to the server via the internet.

Meanwhile, the network interface 135 may include a communication module (not shown) for connection with a wired/wireless network.

The external device interface 130 and/or the network interface 135 may include a communication module for short range communication, such as Wireless Fidelity (Wi-Fi), Bluetooth, Bluetooth Low Energy (BLE), Zigbee, Near Field Communication (NFC), a communication module for cellular communication, such as long-term evolution (LTE), LTE Advance (LTE-A), code division multiple access (CDMA), wideband CDMA (WCDMA), universal mobile telecommunications system (UMTS), Wireless Broadband (WiBro), and the like.

The network interface 135 may transmit or receive data to or from other users or other electronic devices through a connected network or another network linked to the connected network.

The network interface 135 may receive update information and an update file of firmware which are provided by network operators, and may transmit data to internet or content providers or network operators.

The network interface 135 may select a desired application from among a plurality of applications open to the public, and may receive the selected application through a network.

The memory 140 may store programs for processing and controlling each signal within the controller 170, and may store signal-processed video, audio or data signals.

For example, the memory 140 may store applications designed to perform various operations which may be processed by the controller 170, and in response to a request from the controller 170, the memory 140 may selectively provide some of the stored applications.

The programs and the like stored in the memory 140 are not particularly limited, as long as the programs may be executed by the controller 170.

The memory 140 may also perform the function of temporarily storing video, audio or data signals received from an external device through the external device interface 130.

The memory 140 may store information on predetermined broadcast channels through a channel memory function, such as channel map and the like.

While FIG. 2 illustrates an example in which the memory 140 is provided separately from the controller 170, the scope of the present disclosure is not limited thereto, and the memory 140 may be included in the controller 170.

The memory 140 may include at least one of a volatile memory (e.g., DRAM, SRAM, SDRAM, etc.) and a non-volatile memory (e.g., flash memory, hard disk type memory (HDD), solid-state drive (SSD), etc.). In various embodiments of the present disclosure, the memory 140 and the memory may be used interchangeably.

The user input interface 150 may transmit a signal, input by a user, to the controller 170 or may transmit a signal, input from the controller 170, to the user.

For example, the user input interface 150 may transmit/receive a user input signal, such as power on/off, channel selection, screen setup, etc., to/from the remote controller 200, and may transmit a user input signal input through a local key (not shown), such as a power key, a channel key, a volume key, or a setup value, to the controller 170, or may transmit a user input signal, input from a sensor unit (not shown), which senses a user's gesture, to the controller 170, or may transmit a signal from the controller 170 to the sensor unit.

The input unit 160 may be provided on one side of a main body of the image display device 100. For example, the input unit 160 may include a touchpad, a physical button, and the like.

The input unit 160 may receive various user commands associated with the operation of the image display device 100, and may transmit a control signal corresponding to the input command to the controller 170.

The input unit 160 may include at least one microphone (not shown), and may receive a user's speech through the microphone.

The controller 170 may include at least one processor, and by using the included processor, the controller 170 may control the overall operation of the image display device 100. Here, the processor may be a general processor such as a central processing unit (CPU). Obviously, the processor may be a dedicated device, such as an ASIC, or other hardware-based processor.

The controller 170 may demultiplex the stream signal received from the tuner 110, the demodulator 120, the external device interface 130, or the network interface 135 into a number of signals, or may process the demultiplexed signals into video or audio data and output the video or audio data.

The display 180 may convert a video signal, a data signal, an OSD signal, and a control signal processed by the controller 170 or a video signal, a data signal and a control signal received from the external device interface 130 to generate driving signals.

The display 180 may include a display panel (not shown) including a plurality of pixels.

The plurality of pixels included in the display panel may have RGB sub-pixels. Alternatively, the plurality of pixels included in the display panel may have RGBW sub-pixels. The display 180 may convert the video signal, data signal, OSD signal, control signal, and the like processed by the controller 170 to generate signals for driving the plurality of pixels.

The display 180 may be a Plasma Display Panel (PDP), a Liquid Crystal Display (LCD), an Organic Light Emitting Diode (OLED), a flexible display, or the like, and may also be a three-dimensional (3D) display. The 3D display 180 may be divided into an autostereoscopic display and a glasses-type display.

Further, the display 180 may be configured as a touch-screen to be used as an input device in addition to an output device.

The audio output unit 185 may include at least one speaker (not shown), and may receive an audio signal processed by the controller 170, and outputs the audio signal as sound through the at least one speaker.

The image signal, processed by the controller 170, may be input to the display 180 to be displayed as an image corresponding to the image signal. Further, the image signal processed by the controller 170 may be input to an external output device through the external device interface 130.

The audio signal processed by the controller 170 may be output as sound to the audio output unit 185. Further, the audio signal processed by the controller 170 may be input to an external output device through the external device interface 130.

Although not illustrated in FIG. 2, the controller 170 may include a demultiplexer, a video processor, etc., which will be described later with reference to FIG. 3.

Besides, the controller 170 may control the overall operation of the image display device 100. For example, the controller 170 may control the tuner 110 to tune in to a broadcast channel selected by a user or a prestored channel.

In addition, the controller 170 may control the image display device 100 according to a user command input through the user input interface 150 or an internal program.

Meanwhile, the controller 170 may control the display 180 to display images. Here, the images displayed on the display 180 may be still images or moving images and may be 2D images or 3D images.

Meanwhile, the controller 170 may control a predetermined 2D object to be displayed in an image displayed on the display 180. For example, the object may be at least one of an accessed web screen (newspaper, magazine, etc.), an electronic program guide (EPG), various menus, a widget, an icon, a still image, a moving image, and text.

Meanwhile, the image display device 100 may further include an image capturing unit (not shown). The image capturing unit may capture images of a user. The image capturing unit may be implemented with one camera, but is not limited thereto, and may be implemented with a plurality of cameras. Further, the image capturing unit may be embedded in the image display device 100 on the top of the display 180, or may be provided separately. Image information captured by the image capturing unit may be input to the controller 170.

The controller 170 may recognize a user's position based on the images captured by the image capturing unit. For example, the controller 170 may identify a distance (z-axis coordinates) between the user and the image display device 100. In addition, the controller 170 may identify x-axis coordinates and y-axis coordinates corresponding to a user's position in the display 180.

The controller 170 may sense a user's gesture based on the images captured by the image capturing unit or the respective signals sensed by the sensor unit, or a combination thereof.

The power supply unit 190 may supply power throughout the image display device 100. Particularly, the power supply unit 190 may supply power to the controller 170 implemented in the form of a system on chip (SOC), the display 180 for image display, the audio output unit 185 for audio output, and the like.

Specifically, the power supply unit 190 may include a converter for converting AC power into DC power and a DC/DC converter (not shown) for changing a DC power level.

The remote controller 200 transmits a user input to the user input interface 150. To this end, the remote controller 200 may use Bluetooth, radio frequency (RF) communication, infrared (IR) communication, Ultra Wideband (UWB), ZigBee, and the like. Furthermore, the remote controller 200 may receive video, audio or data signals output from the user input interface 150, and may display the received signals or output the same as sound through the remote controller 200.

Meanwhile, the aforementioned image display device 100 may be a fixed type or movable digital broadcast receiver capable of receiving digital broadcast.

Meanwhile, the block diagram of the image display device 100 illustrated in FIG. 2 is merely a block diagram for an embodiment of the present disclosure. Components of the block diagram may be integrated, added or omitted according to specifications of the actually implemented image display device 100.

That is, two or more components may be combined or one component may be divided into two or more components as needed. Furthermore, a function executed in each block is for description of an embodiment of the present disclosure, and a specific operation or device of each block is not intended to limit the scope of the present disclosure.

Figure 3:
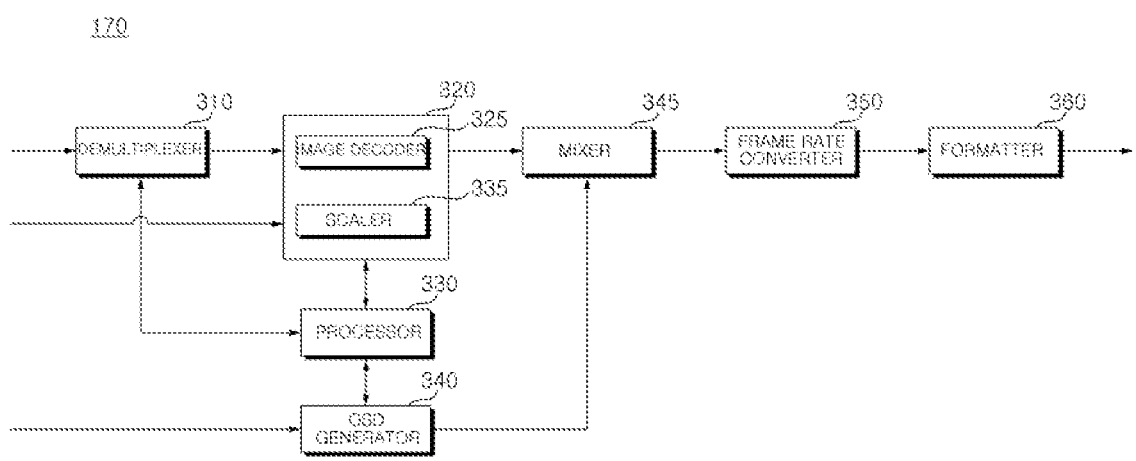
FIG. 3 is an internal block diagram of a controller of FIG. 2.

FIG. 3 is an internal block diagram of the controller of FIG. 2.

Referring to FIG. 3, the controller 170 according to an embodiment of the present disclosure may include a demultiplexer 310, an image processor 320, a processor 330, an OSD generator 340, a mixer 345, a frame rate converter 350, a formatter 360, and/or an audio processor 370. The controller 170 may further include a data processor (not shown).

The demultiplexer 310 demultiplexes the input stream. For example, when an MPEG-2 TS is input, the demultiplexer 310 may demultiplex the MPEG-2 TS into video, audio, and data signals, respectively. Here, the stream signal input to the demultiplexer 310 may be a stream signal output from the tuner unit 110, the demodulator 120, or the external device interface 130.

The image processor 320 may perform image processing on the demultiplexed video signal. To this end, the image processor 320 may include an image decoder 325 and a scaler 335.

The image decoder 325 decodes the demultiplexed video signal, and the scaler 335 performs scaling so that the resolution of the decoded video signal may be output to the display 180.

The image decoder 325 may include a decoder of various standards. For example, a 3D image decoder for MPEG-2, H.264 decoder, a color image, and a depth image, and a decoder for a multiple view image may be provided.

The processor 330 may control the overall operation of the image display device 100 or the controller 170. For example, the processor 330 may control the tuner 110 to tune in to an RF broadcast channel selected by a user or a prestored channel.

In addition, the processor 330 may control the image display device 100 by a user command input through the user input interface 150 or an internal program.

Further, the processor 330 may control data transmission with the network interface 135 or the external device interface 130.

Moreover, the processor 330 may control operations of the demultiplexer 310, the image processor 320, the OSD generator 340, and the like in the controller 170.

The OSD generator 340 generates an OSD signal according to a user input or by itself. For example, based on a user input signal input through the input unit 160, the OSD generator 340 may generate a signal for displaying a variety of information as a graphic or a text on the screen of the display 180.

The generated OSD signal may include various data such as a user interface screen of the image display device 100, various menu screens, a widget, and an icon. In addition, the generated OSD signal may include a 2D object or a 3D object.

In addition, the OSD generator 340 may generate a pointer that may be displayed on the display, based on a pointing signal input from the remote controller 200.

The OSD generator 340 may include a pointing signal processing unit (not shown) for generating a pointer. The pointing signal processing unit (not shown) may be provided separately, rather than being provided in the OSD generator 240.

The mixer 345 may mix an OSD signal generated by the OSD generator 340 with a decoded image signal image-processed by the image processor 320. The mixed image signal may be supplied to the frame rate converter 350.

The frame rate converter (FRC) 350 may convert the frame rate of an input image. Meanwhile, the frame rate converter 350 may also directly output the frame rate without any additional frame rate conversion.

The formatter 360 may arrange a left-eye video frame and a right-eye video frame of the 3D video signal subjected to frame rate conversion. Further, a synchronization signal Vsync may be output for opening the left-eye glass and the right-eye glass of the 3D viewing device (not shown).

Meanwhile, the formatter 360 may convert the format of an input image signal into an image signal to be displayed and output on the display 180.

In addition, the formatter 360 may change the format of a 3D image signal. For example, the formatter 360 may change the format of the 3D image signal into any one of various 3D formats such as a side by side format, a top/down format, a frame sequential format, an interlaced format, a checker box format, and the like.

Meanwhile, the formatter 360 may convert a 2D video signal into a 3D video signal. For example, the formatter 360 may detect an edge or a selectable object from the 2D video signal and separate an object according to the detected edge or the selectable object as a 3D video signal to thereby generate the 3D video signal according to a 3D video generation algorithm. In this case, the generated 3D video signal may be separated into a left-eye video signal L and a right-eye video signal R and aligned as described above.

Meanwhile, although not illustrated herein, a 3D processor (not shown) for 3-dimensional (3D) effect signal processing may be further provided following the formatter 360. Such a 3D processor (not shown) may control brightness, tint and color of a video signal for 3D effect enhancement. For example, the 3D processor (not shown) may perform signal processing for making a close-range view clear and blurring a distant view. The function of the 3D processor may be integrated with the formatter 360 or the image processor 320.

Meanwhile, the audio processor (not shown) included in the controller 170 may process a demultiplexed audio signal. To this end, the audio processor (not shown) may include various decoders.

In addition, the audio processor (not shown) included in the controller 170 may control base, treble, volume, and the like.

The data processor (not shown) included in the controller 170 may process the demultiplexed data signal. For example, when the demultiplexed data signal is an encoded data signal, the encoded data signal may be decoded. The encoded data signal may be electronic program guide (EPG) information including broadcast information such as start time and finish time of a broadcast program that is broadcast through each channel.

Meanwhile, the block diagram of the controller 170 illustrated in FIG. 3 is merely a block diagram for an embodiment of the present disclosure, and components of the block diagram may be integrated, added, or omitted according to the specifications of the actually implemented controller 170.

Particularly, each of the frame rate converter 350 and the formatter 360 may be separately provided instead of being included in the controller 170, or may be provided separately as one module.

Figure 4A:
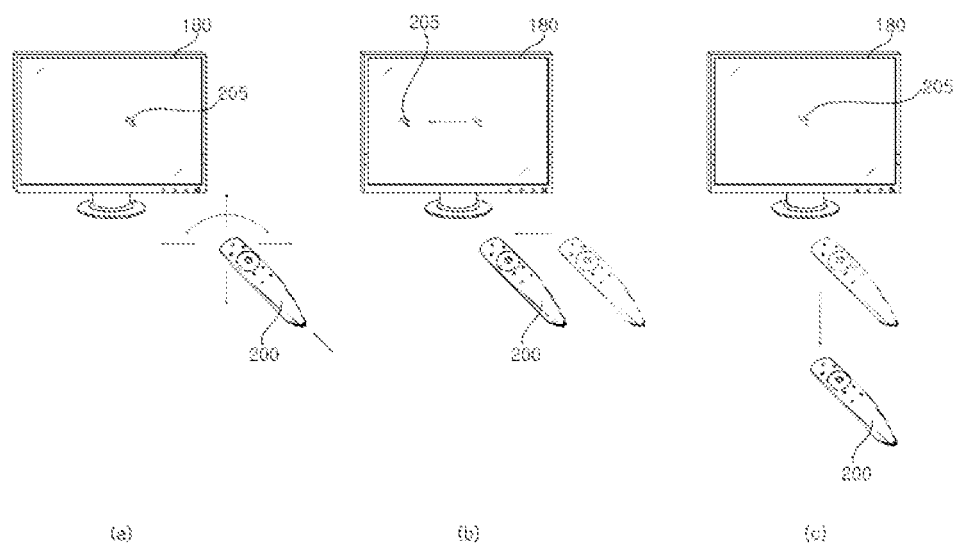
FIG. 4A is a diagram illustrating a method of controlling a remote controller of FIG. 1.
Figure 4B:
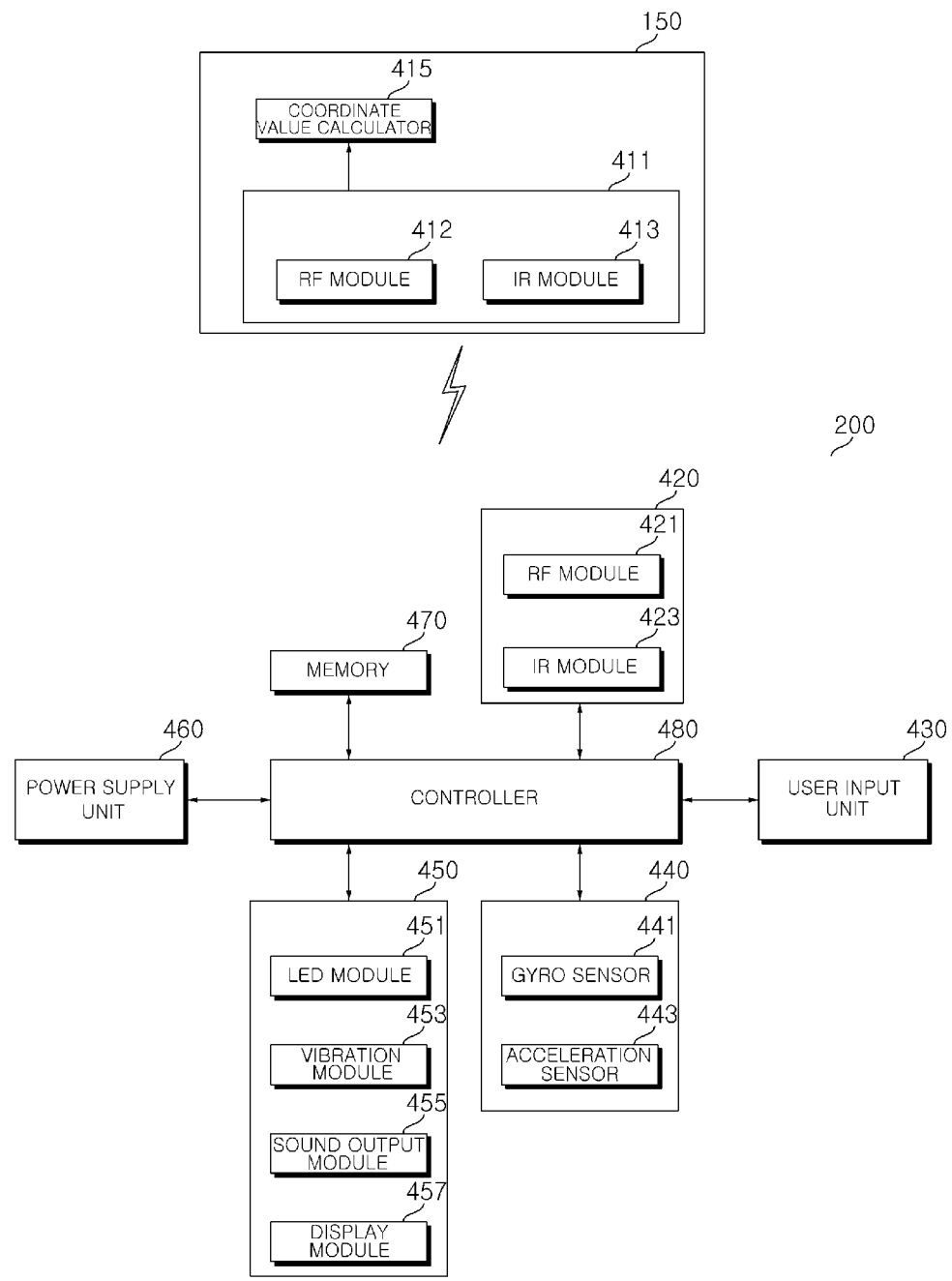
FIG. 4B is an internal block diagram of the remote controller of FIG. 1.

FIG. 4A is a diagram illustrating a method of controlling the remote controller of FIG. 1, and FIG. 4B is an internal block diagram of the remote controller of FIG. 1.

Referring to FIG. 4A, it can be seen that a pointer 205 corresponding to the remote controller 200 is displayed on the display 180 of the image display device 100.

Referring to (a) of FIG. 4A, a user may move or rotate the remote controller 200 up and down, left and right, and back and forth. In this case, the pointer 205 displayed on the display 180 of the image display device 100 may be displayed according to movement of the remote controller 200. The remote controller 200 may be referred to as a spatial remote controller or a 3D pointing device, because the pointer 205 corresponding thereto is moved and displayed according to movement in a 3D space, as illustrated in the drawing.

Referring to (b) of FIG. 4A, it can be seen that when the user moves the remote controller 200 to the left, the pointer 205 displayed on the display 180 of the image display device 100 also moves to the left according to the movement of the remote controller 200.

Data on movement (hereinafter referred to as movement data) of the remote controller 200 detected by a sensor of the remote controller 200 may be transmitted to the image display device 100. For example, the remote controller 200 may transmit an input signal, including the movement data, to the image display device 100 during a predetermined transmission period. In this case, upon receiving a control signal for changing a transmission period from the image display device 100, the remote controller 200 may change the transmission period according to the received control signal.

Meanwhile, the remote controller 200 may change an amount of movement data included in the input signal to be transmitted to the image display device 100. For example, if the transmission period is changed, the remote controller 200 may change an amount of the movement data included in the input signal, in response to the change in transmission period.

The image display device 100 may calculate coordinates of the pointer 205 based on the movement data included in the input signal received from the remote controller 200. The image display device 100 may display the pointer 205 corresponding to the calculated coordinates.

In this case, the image display device 100 may display the pointer 205 by directly calculating coordinates of the pointer 205 based on the movement data included in the input signal. Alternatively, the image display device 100 may display the pointer 205 by storing the movement data, included in the input signal, in the memory 140 and processing the movement data, and then by calculating the coordinates of the pointer 205 based on the processed movement data.

Referring to (c) of FIG. 4A, a user moves the remote controller 200 away from the display 180 while pressing a specific button of the remote controller 200. Thus, a selected area on the display 180 corresponding to the pointer 205 may be zoomed in and thus magnified. On the contrary, when the user moves the remote controller 200 toward the display 180, a selected area on the display 180 corresponding to the pointer 205 may be zoomed out and thus reduced.

Meanwhile, when the remote controller 200 moves away from the display 180, the selected area may be zoomed out, and when the remote controller 200 approaches the display 180, the selected area may be zoomed in.

Meanwhile, when a user presses a specific button of the remote controller 200, recognition of up/down movement and left/right movement may not be recognized. That is, when the remote controller 200 moves away from or approaches the display 180, up/down movement and left/right movement may not recognized, but only the forward/backward movement may be recognized. When the user does not press the specific button of the remote controller 200, only the up/down movement and left/right movement of the remote controller 200 may be recognized, and only the pointer 205 may move according to the movements.

Meanwhile, a moving speed or moving direction of the pointer 205 may correspond to a moving speed or moving direction of the remote controller 200.

Referring to FIG. 4B, the remote controller 200 may include a wireless transceiver 420, a user input unit 430, a sensor unit 440, an output unit 450, a power supply unit 460, a memory 470, and/or a controller 480.

The wireless transceiver 420 transmits/receives signals to/from the image display device 100.

In this embodiment, the remote controller 200 may include an RF module 421 for transmitting and receiving signals to/from the image display device 100 according to RF communication standards. In addition, the remote controller 200 may include an IR module 423 for transmitting and receiving signals to/from the image display device 100 according to IR communication standards.

The remote controller 200 transmits a signal containing information on movement of the remote controller 200 to the image display device 100 through the RF module 421. The remote controller 200 may receive the signal, transmitted from the image display device 100, through the RF module 421.

The remote controller 200 may transmit commands for power on/off, channel change, volume change, and the like to the image display device 100 through the IR module 423.

The user input unit 430 may be configured as a keypad, a button, a touchpad, a touchscreen, or the like. The user may input a command related to the image display device 100 to the remote controller 200 by manipulating the user input device 430.

When the user input unit 430 includes a hard key button, the user may input a command related to the image display device 100 to the remote controller 200 by pushing the hard key button.

When the user input unit 430 includes a touchscreen, the user may input a command related to the image display device 100 to the remote controller 200 by touching a soft key of the touchscreen.

Furthermore, the user input unit 430 may include various types of input means, such as a scroll key, a jog key, etc., which can be operated by the user, and the scope of the present disclosure is not limited by this embodiment.

The user input unit 430 may include at least one microphone and may receive an instruction corresponding to a user's speech and the like.

The sensor unit 440 may include a gyro sensor 441 or an acceleration sensor 443. The gyro sensor 441 may sense information on movement of the remote controller 200.

For example, the gyro sensor 441 may sense information on operation of the remote controller 200 on the basis of x, y, and z axes. The acceleration sensor 443 may sense information on a moving speed of the remote controller 200. Meanwhile, the sensor unit 440 may further include a distance measurement sensor for sensing a distance to the display 180.

The output unit 450 may output a video or audio signal corresponding to manipulation of the user input unit 430 or a signal transmitted from the image display device 100. Through the output device 450, the user may recognize whether the user input unit 430 is manipulated or whether the image display device 100 is controlled.

The output unit 450 may include an LED module 451 that is turned on, a vibration module 453 that generates vibration, a sound output module 455 that outputs sound, and/or a display module 457 that outputs an image, when the user input unit 430 is manipulated or a signal is transmitted/received to/from the image display device 100 through the wireless transceiver 420.

The power supply unit 460 supplies power to the remote controller 200. When the remote controller 200 is not moved for a predetermined time, the power supply unit 460 may stop the supply of power to reduce the waste of power. The power supply unit 460 may resume power supply when a predetermined key of the remote controller 200 is manipulated.

The memory 470 may store various types of programs, application data, and the like necessary for the control or operation of the remote controller 200.

If the remote controller 200 wirelessly transmits/receives a signal to/from the image display device 100 through the RF module 421, the remote controller 200 and the image display device 100 transmit/receive signals in a predetermined frequency band. The controller 480 of the remote controller 200 may store, in the memory 470, information about the frequency band for wirelessly transmitting/receiving signals to/from the image display device 100 paired with the remote controller 200 and may refer to the stored information.

The controller 480 may include at least one processor, and may control the overall operation of the remote controller 200 by using a processor included therein.

The controller 480 may transmit a signal corresponding to manipulation of a predetermined key of the user input unit 430, or a signal corresponding to movement of the remote controller 200 sensed by the sensor unit 440, to the image display device 100 through the wireless transceiver 420.

The user input interface 150 of the image display device 100 includes a wireless transceiver 151 that can wirelessly transmit/receive signals to/from the remote controller 200 and a coordinate value calculator 415 that can calculate a coordinate value of a pointer corresponding to operation of the remote controller 200.

The user input interface 150 may wirelessly transmit/receive signals to/from the remote controller 200 through an RF module 412. In addition, the user input interface 150 may receive a signal transmitted by the remote controller 200 through an IR module 413 according to IR communication standards.

The coordinate value calculator 415 may correct trembling of the hand or errors in an input signal including movement data, which is received through the wireless transceiver 151, and may calculate coordinates (x, y) of the pointer 205 to be displayed on the display 180.

A signal transmitted from the remote controller 200 and input to the image display device 100 through the user input interface 150 is transmitted to the controller 180 of the image display device 100. The controller 180 may identify information regarding operation and key manipulation of the remote controller 200 from the signal transmitted from the remote controller 200, and may control the image display device 100 based on the information.

In another example, the remote controller 200 may calculate coordinates of the pointer corresponding to the operation thereof and output the coordinates to the user input interface 150 of the image display device 100. In this case, the user input interface 150 of the image display device 100 may transmit information about the received pointer coordinates to the controller 180 without separately correcting trembling of the hand or errors.

Further, in yet another example, the coordinate value calculator 415 may be provided in the controller 170 unlike the drawing, instead of being included in the user input interface 150.

Figure 5:
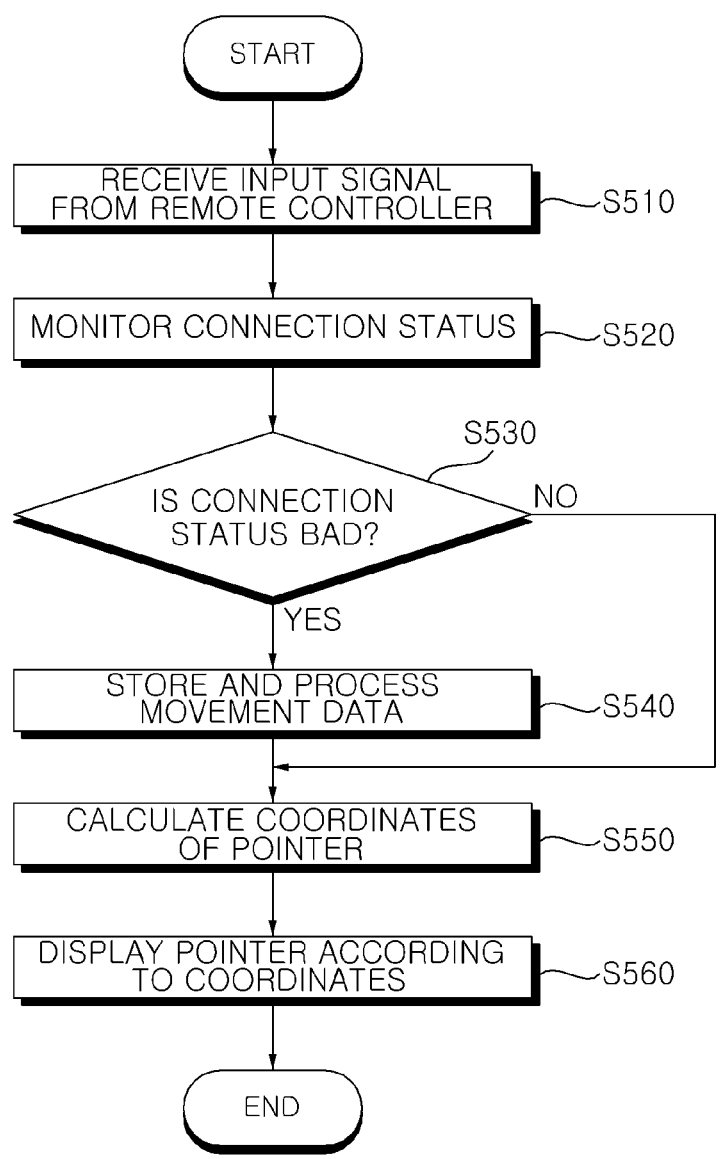
FIG. 5 is a flowchart illustrating a method of operating an image display device according to an embodiment of the present disclosure.

FIG. 5 is a flowchart illustrating a method of operating an image display device according to an embodiment of the present disclosure, and FIGS. 6 to 9 are diagrams referred to in the description of a method of operating an image display device.

Referring to FIG. 5, the image display device 100 may receive an input signal, including movement data, from the remote controller 200 via short-range communication in operation S510. For example, the remote controller 200 may sense movement of the remote controller 200 by using the gyro sensor 441 and/or the acceleration sensor 443, and may transmit the input signal, including the movement data, to the image display device 100 in a predetermined transmission period.

In this case, the image display device 100 may receive the input signal transmitted from the remote controller 200 in the predetermined transmission period.

The image display device 100 may monitor a connection status with the remote controller 200 based on the input signal received from the remote controller 200 in operation S520. For example, the image display device 100 may check whether the input signal is received in the predetermined transmission period, and may determine a connection status based on the checking.

The image display device 100 may determine whether the connection status with the remote controller 200 is bad in operation S530.

The image display device 100 may determine whether the connection status with the remote controller 200 is bad based on a transmission period in which the remote controller 200 transmits the input signal, and a period in which the input signal is received from the remote controller 200, which will be described below with reference to FIG. 6.

Figure 6:
FIGS. 6 to 9 are diagrams referred to in the description of a method of operating an image display device.
Figure 6:
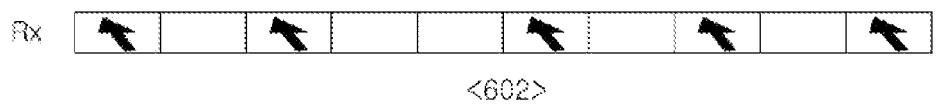

Reference numeral 601 of FIG. 6 denotes a timeline during which the remote controller 200 transmits the input signal, including the movement data, according to a predetermined first period (e.g. 10 ms), and reference numeral 602 denotes a timeline during which the image display device 100 receives the input signal.

Referring to FIG. 6, the remote controller 200 transmits the input signal according to the predetermined first period (e.g., 10 ms), but the image display device 100 fails to receive the input signal according to the predetermined first period (e.g., 10 ms), such that an interval between time points at which the input signal is received exceeds the first period (e.g., 10 ms), and thus the image display device 100 may determine that the connection status with the remote controller 200 is bad.

Meanwhile, the image display device 100 may determine whether the connection status with the remote controller 200 is bad based on the number of external devices connected via short-range communication and/or an intensity of the input signal received from the remote controller 200. For example, if the number of external devices connected via short-range communication is greater than or equal to a predetermined number, and/or if an intensity of the input signal is less than a predetermined intensity, the image display device 100 may determine that the connection status is bad.

Meanwhile, upon first determining the connection status with the remote controller 200 based on a reception period of the input signal, the image display device 100 may determine whether the connection status with the remote controller 200 is bad based on the number of external devices connected via short-range communication and/or the intensity of the input signal received from the remote controller 200.

Referring back to FIG. 5, if the connection status with the remote controller 200 is bad, the image display device 100 may store the movement data, included in the input signal, in the memory 140 and may process the movement data, sequentially stored in the memory 140, in operation S540. In this case, the amount of movement data stored in the memory 140 may be limited, and the movement data may be stored on a first-in-first-out (FIFO) basis in the memory 140.

For example, if the connection status with the remote controller 200 is bad, the image display device 100 may generate data for correcting a display of the pointer 205 (hereinafter referred to as correction data) based on the movement data sequentially stored in the memory 140, and may store the correction data between the movement data stored in the memory 140, which will be described below with reference to FIG. 7.

Figure 7:
Figure 7:
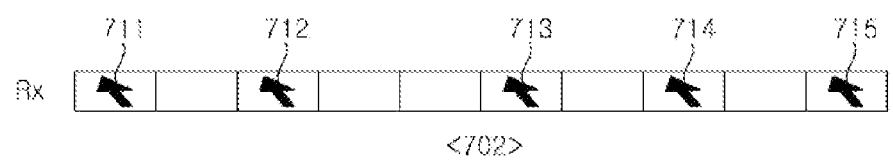
Figure 7:
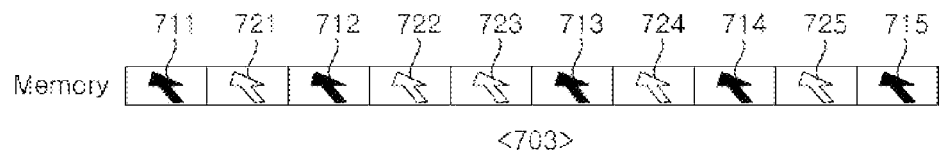

Reference numeral 701 of FIG. 7 denotes a timeline during which the remote controller 200 transmits the input signal, including the movement data, according to the predetermined first period (e.g. 10 ms), reference numeral 702 denotes a timeline during which the image display device 100 receives the input signal, and reference numeral 703 denotes the movement data stored in the memory 140 of the image display device 100.

Referring to FIG. 7, it can be confirmed that the remote controller 200 transmits the input signal including the movement data according to the predetermined first period (e.g., 10 ms), but the image display device 100 fails to receive the input signal according to the predetermined first period (e.g., 10 ms), such that an interval between time points at which the input signal is received exceeds the first period (e.g., 10 ms).

The image display device 100 may generate a first correction data 721 based on a first movement data 711 and a second movement data 712, and may store the first correction data 721 between the first movement data 711 and the second movement data 712.

In this case, the first correction data may be data corresponding to a median value or a mean value of the first movement data 711 and the second movement data 712. For example, coordinates of the pointer 205 that correspond to the first correction data may be a median value of coordinates of the pointer 205 that correspond to the first movement data 711 and the coordinates of the pointer 205 that correspond to the second movement data 712.

Further, the image display device 100 may generate second and third correction data 722 and 723 based on the second movement data 712 and third movement data 713, and may sequentially store the second and third correction data 722 and 723 between the second movement data 712 and the third movement data 713. For example, the second correction data 722 may be data corresponding to a median value of the second movement data 712 and the third movement data 713, and the third correction data 723 may be data corresponding to a median value of the second correction data 722 and the third movement data 713.

In addition, likewise/similarly, the image display device 100 may generate fourth and fifth correction data 724 and 725 and may stored the generated data in the memory 140.

Meanwhile, if the connection status with the remote controller 200 is bad, the image display device 100 may transmit, to the remote controller 200, a control signal for controlling the remote controller 200 to change the predetermined transmission period in operation S540. For example, if the connection status with the remote controller 200 is bad, the image display device 100 may change the predetermined transmission period from the first period (e.g., 10 ms) to a second period (e.g., 20 ms) and may transmit, to the remote controller 200, a control signal for controlling the remote controller 200 to change the transmission period to the second period (e.g., 20 ms).

In this case, if the predetermined transmission period is changed, the image display device 100 may transmit, to the remote controller 200, a control signal for changing an amount of movement data included in the input signal, in response to the change in transmission period. Here, the amount of movement data included in the input signal may increase with an increase in the transmission period. Alternatively, upon receiving the control signal for changing the predetermined transmission period, the remote controller 200 may change the amount of movement data included in the input signal, in response to the change in transmission period, which will be described below with reference to FIG. 8.

Figure 8:
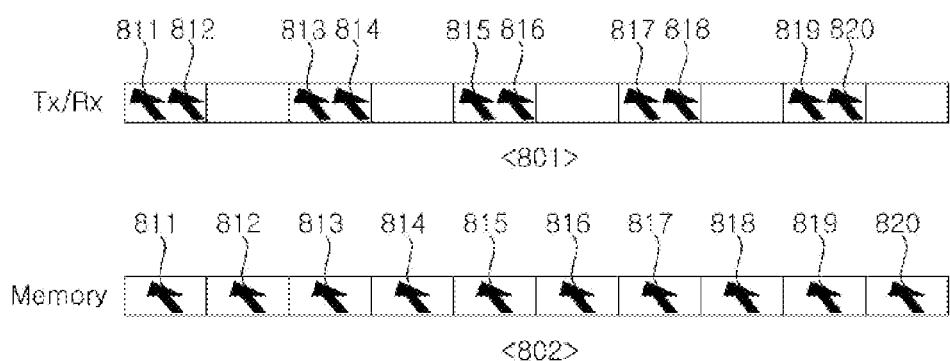

Reference numeral 801 of FIG. 8 denotes a timeline during which the image display device 100 and the remote controller 200 transmit/receive the input signal, including the movement data, according to the second period (e.g., 20 ms) which is longer than the predetermined first period (e.g. 10 ms), and reference numeral 802 denotes the movement data stored in the memory 140 of the image display device 100.

Referring to FIG. 8, if the image display device 100 transmits, to the remote controller 200, the control signal for changing the transmission period of the input signal from the first period (e.g., 10 ms) to the second period (e.g., 20 ms), the remote controller 200 may transmit the input signal including the movement data according to the second period (e.g., 20 ms), and the image display device 100 may also receive the input signal according to the second period (e.g., 20 ms).

In this case, based on a ratio between the first period (e.g., 10 ms) and the second period (e.g., 20 ms), the remote controller 200 may transmit the input signal, including a doubled amount of movement data, to the image display device 100. For example, the remote controller 200 may store a first movement data 811 in the memory 470 according to an increased transmission period of the input signal, and then may transmit the first movement data along with second movement data 812 to the image display device 100.

Meanwhile, the image display device 100 may sequentially store, in the memory 140, the first and second movement data 811 and 812 including in the input signal received according to the second period (e.g. 20 ms). Further, likewise/similarly, the image display device 100 may sequentially store, in the memory 140, third and fourth movement data 813 and 814 received according to the second period (e.g., 20 ms).

Meanwhile, even when the transmission period is changed to the second period (e.g., 20 ms), if the connection status with the remote controller 200 is bad, the image display device 100 may generate correction data based on the movement data included in the input signal received according to the second period (e.g., 20 ms) and may store the correction data between the movement data stored in the memory 140, which will be described below with reference to FIG. 9.

Figure 9:
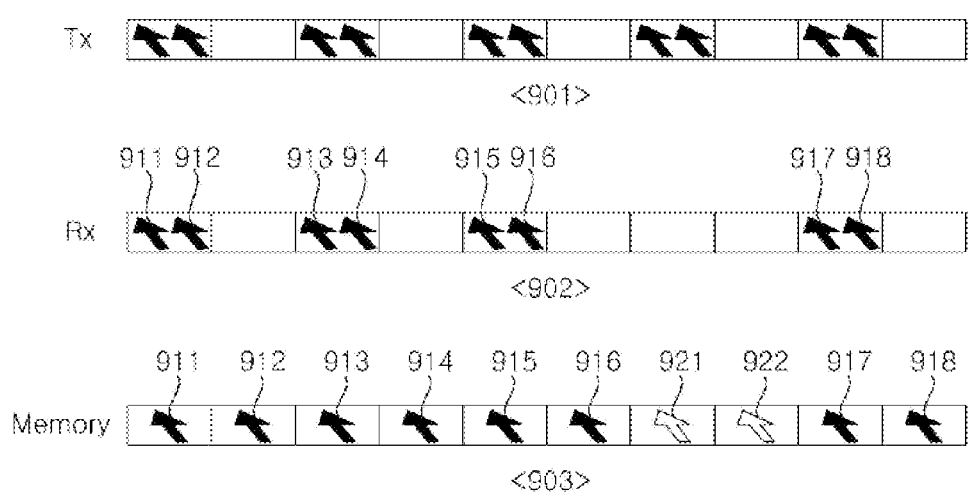

Reference numeral 901 of FIG. 9 denotes a timeline during which the remote controller 200 transmits the input signal, including the movement data, according to the second period (e.g., 20 ms), reference numeral 902 denotes a timeline during which the image display device 100 receives the input signal, and reference numeral 903 denotes the movement data stored in the memory 140 of the image display device 100.

Referring to FIG. 9, it can be confirmed that the remote controller 200 transmits the input signal including the movement data according to the second period (e.g., 20 ms), but the image display device 100 fails to receive the input signal according to the predetermined second period (e.g., 20 ms), such that an interval between time points at which the input signal is received exceeds the second period (e.g., 20 ms).

In this case, the image display device 100 may generate a first correction data 921, corresponding to a median value of a sixth movement data 916 and a seventh movement data 917, and may generate a second correction data 922 corresponding to a median value of the first correction data 921 and the seventh movement data 917.

Further, the image display device 100 may sequentially store the first and second correction data 921 and 922 between the sixth and seventh movement data 916 and 917.

Referring back to FIG. 5, in operations S550 and S560, the image display device 100 may calculate coordinates of the pointer 205 which correspond to the remote controller 200 and may display the pointer 205 on the display 180 according to the calculated coordinates.

If the connection status with the remote controller 200 is good, the image display device 100 may calculate coordinates of the pointer 205 based on the movement data included in the input signal received from the remote controller 200, and may display the pointer 205 on the display 180 based on the calculated coordinates.

That is, if the connection status with the remote controller 200 is good, the operation of storing the movement data, included in the input signal, in the memory 140 may be omitted, and the image display device 100 may calculate coordinates of the pointer 205 without change, and then may display the pointer 205 on the display 180 based on the calculated coordinates.

Meanwhile, if the connection status with the remote controller 200 is bad, the image display device 100 may calculate coordinates of the pointer 205 based on the movement data and/or the correction data which are stored in the memory 140, and may display the pointer 205 on the display 180 based on the calculated coordinates.

As described above, according to various embodiments of the present disclosure, the communication status between the image display device 100 and the remote controller 200 is monitored, and even when the image display device 100 fails to receive the movement data of the remote controller 200 due to a bad communication status, the image display device 100 may naturally display the pointer 205, corresponding to movement of the remote controller 200, on the display 180 based on previously received movement data.

In addition, according to various embodiments of the present disclosure, if the communication status between the image display device 100 and the remote controller 200 is bad, the image display device 100 may change a period of data transmission and reception between the image display device 100 and the remote controller 200, and may change an amount of movement data included in the input signal output from the remote controller 200, thereby naturally displaying the pointer 205, corresponding to movement of the remote controller 200, on the display 180.

The accompanying drawings are used to help easily understand various technical features and it should be understood that the embodiments presented herein are not limited by the accompanying drawings, and the present disclosure should be construed to extend to any alterations, equivalents and substitutes in addition to those which are particularly set out in the accompanying drawings.

The method of operating the image display device of the present disclosure may be implemented as code that can be written to a processor-readable recording medium and can thus be read by a processor included in the image display device. The processor-readable recording medium may be any type of recording device in which data can be stored in a processor-readable manner. Examples of the processor-readable recording medium include a ROM, a RAM, a CD-ROM, a magnetic tape, a floppy disk, an optical data storage, and a carrier wave, e.g., data transmission over the Internet. Furthermore, the processor-readable recording medium can be distributed over a plurality of computer systems connected to a network so that processor-readable code is written thereto and executed therefrom in a decentralized manner.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

The invention claimed is:

1. An image display device comprising:
 a display configured to display a pointer corresponding to a remote controller;
 an external device interface including at least one communication module and configured to perform short-range communication; and
 a controller,
 wherein the controller:
 receives, from the remote controller, an input signal including movement data of the remote controller through the external device interface;
 monitors a connection status with the remote controller based on the received input signal;
 if the connection status is good, calculates coordinates of the pointer based on the movement data included in the input signal;
 if the connection status is bad, processes the movement data included in the input signal, and then calculates coordinates of the pointer based on the processed data; and
 displays the pointer on the display based on the calculated coordinates of the pointer.

2. The image display device of claim 1, wherein the controller:
 in response to the input signal being received in a predetermined first period, determines that the connection status is good:
 in response to the input signal being received in a period exceeding the predetermined first period, determines that the connection status is bad.

3. The image display device of claim 2, wherein based on at least one of a case where a number of external devices connected via the short-range communication is greater than or equal to a predetermined number and a case where an intensity of the input signal is less than a predetermined intensity, the controller finally determines that the connection status is bad.

4. The image display device of claim 2, further comprising a memory,
 wherein in response to determining that the connection status is bad, the controller stores the movement data, included in the input signal, in the memory, processes the movement data sequentially stored in the memory, and calculates coordinates of the pointer.

5. The image display device of claim 4, wherein
 in response to an interval between a first time point, at which a first data is received, and a second time point at which a second data is received, exceeding the predetermined first period, the controller generates at least one third data corresponding to the interval between the first time point and the second time point, and stores the generated at least one third data between the first data and the second data.

6. The image display device of claim 5, wherein by calculating a median value of the first data and the second data, the controller generates the at least one third data.

7. The display device of claim 4, wherein if the connection status is bad, the controller changes a transmission period of the input signal to a second period which is longer than the first period, and transmits, to the remote controller, a control signal for increasing an amount of the movement data of the remote controller, included in the input signal, according to a ratio between the first period and the second period.

8. The display device of claim 7, wherein the controller sequentially stores, in the memory, the movement data included in the input signal and received in the second period.

9. A method of operating an image display device, the method comprising:
 receiving, from a remote controller connected via short-range communication, an input signal including movement data of the remote controller;
 monitoring a connection status with the remote controller based on the received input signal;
 if the connection status is good, calculating coordinates of the pointer corresponding to the remote controller based on the movement data included in the input signal;
 if the connection status is bad, processing the movement data included in the input signal, and then calculating coordinates of the pointer based on the processed data; and
 displaying the pointer on a display of the image display device based on the calculated coordinates of the pointer.

* * * * *